(12) United States Patent
Terakawa

(10) Patent No.: US 7,881,528 B2
(45) Date of Patent: Feb. 1, 2011

(54) FACE DETECTING METHOD AND PHOTOGRAPHY APPARATUS USING THE METHOD

(75) Inventor: Kensuke Terakawa, Kanagawa-ken (JP)

(73) Assignee: FujiFilm Corporation, Tokyo (JP)

( * ) Notice: Subject to any disclaimer, the term of this patent is extended or adjusted under 35 U.S.C. 154(b) by 978 days.

(21) Appl. No.: 11/730,104

(22) Filed: Mar. 29, 2007

(65) Prior Publication Data

US 2007/0230796 A1    Oct. 4, 2007

(30) Foreign Application Priority Data

Mar. 30, 2006    (JP)    ............................. 2006-093905

(51) Int. Cl.
*G06K 9/00* (2006.01)
(52) U.S. Cl. .................. 382/165; 382/118; 382/224
(58) Field of Classification Search .............. 382/118, 382/162, 165, 224, 227
See application file for complete search history.

(56) References Cited

U.S. PATENT DOCUMENTS

| 5,819,247 | A | 10/1998 | Freund et al. |
| 6,633,655 | B1 * | 10/2003 | Hong et al. ................. 382/118 |
| 2002/0102024 | A1 | 8/2002 | Jones et al. |

\* cited by examiner

*Primary Examiner*—Phuoc Tran
(74) *Attorney, Agent, or Firm*—Birch, Stewart, Kolasch & Birch, LLP

(57) ABSTRACT

Faces are detected efficiently, while preventing deterioration of face detection accuracy due to brightness during photography or the type of illumination which is employed during photography. When an image is obtained by an imaging means, an illumination judging means judges whether the illumination employed during photography is provided tungsten light source. In the case that the illumination is provided by a tungsten light source, face detection is performed based on a red signal image. In the case that the illumination is not provided by a tungsten light source, face detection is performed based on a green signal image.

20 Claims, 8 Drawing Sheets

FACE DETECTING METHOD AND PHOTOGRAPHY APPARATUS USING THE METHOD

BACKGROUND OF THE INVENTION

1. Field of the Invention

The present invention relates to a face detecting method for detecting face of human subjects within images, and a photography apparatus that employs the face detecting method.

2. Description of the Related Art

The basic principle of face detection, for example, is classification into two classes, either a class of faces or a class not of faces. A technique called "boosting" is commonly used as a classification method for classifying faces (refer to, for example, U.S. Pat. No. 5,819,247). The boosting algorithm is a learning method for classifiers that links a plurality of weak classifiers to form a single strong classifier.

U.S. Patent Application Publication No. 20020102024 discloses a method that speeds up face detecting processes by the boosting technique. In this method, the weak classifiers are provided in a cascade structure, and only images which have been judged to represent faces by upstream weak classifiers are subject to judgment by downstream weak classifiers.

Face detection employing the boosting algorithm such as that disclosed in U.S. Pat. No. 5,819,247 generally employs brightness data (Y signals) of images. On the other hand, image data obtained by digital cameras and the like often are RGB signals. Accordingly, when face detecting processes are administered onto images obtained by digital cameras and the like, it becomes necessary to generate Y signals from the RGB signals. This increases the amount of data to be processed, and prevents face detection from being expedient. Particularly in cases that face detecting apparatuses are incorporated into digital cameras and face detecting processes are administered onto images immediately after obtainment thereof, the Y signal generating process becomes a large factor in preventing fast face detection.

In addition, there are many cases that natural sunlight or flash are used as illumination during photography employing photography apparatuses such as digital cameras. However, there are other cases in which tungsten light sources are used as illumination during photography of buildings, nightscapes, and products. Tungsten light sources have a property that the light emitted therefrom contain more red components than other light sources. Therefore, in the case that face detection is performed with respect to images obtained using tungsten light sources as illumination in the same manner as that performed with respect to images obtained using natural sunlight as illumination, there is a problem that faces cannot be detected therein.

Further, in cases that the brightness is low (dark) during photography, there is a problem that there is insufficient brightness within the obtained images. In these cases, the aforementioned boosting algorithm is not capable of detecting faces within the obtained images.

SUMMARY OF THE INVENTION

The present invention has been developed in view of the foregoing circumstances. It is an object of the present invention to provide a face detecting method that detects faces efficiently, while preventing deterioration of face detection accuracy due to brightness during photography or the type of illumination which is employed during photography. It is another object of the present invention to provide a photography apparatus that employs the face detecting method.

A first face detecting method of the present invention comprises the steps of:

receiving light incident from a human subject for each color component, to obtain a plurality of pieces of pixel data;

generating a raw image of the human subject employing the obtained plurality of pieces of pixel data;

generating a red signal image employing red pixel data, which are among the plurality of pieces of pixel data, obtained by receiving red components of light from the human subject;

generating a green signal image employing green pixel data, which are among the plurality of pieces of pixel data, obtained by receiving green components of light from the human subject;

judging whether illumination during photography of the human subject was provided by a tungsten light source;

detecting a facial image within the raw image by detecting the facial image within the red signal image in the case that it is judged that the illumination was provided by a tungsten light source; and detecting a facial image within the raw image by detecting the facial image within the green signal image in the case that it is judged that the illumination was not provided by a tungsten light source.

A first photography apparatus of the present invention comprises:

imaging means, for receiving light incident from a human subject for each color component, to obtain a plurality of pieces of pixel data;

image generating means, for generating a raw image of the human subject employing the obtained plurality of pieces of pixel data, for generating a red signal image employing red pixel data, which are among the plurality of pieces of pixel data, obtained by receiving red components of light from the human subject, and for generating a green signal image employing green pixel data, which are among the plurality of pieces of pixel data, obtained by receiving green components of light from the human subject;

illumination judging means, for judging whether illumination during photography of the human subject was provided by a tungsten light source; and face detecting means, for detecting a facial image within the raw image by detecting the facial image within the red signal image in the case that it is judged that the illumination was provided by a tungsten light source, and detecting a facial image within the raw image by detecting the facial image within the green signal image in the case that it is judged that the illumination was not provided by a tungsten light source.

A second face detecting method of the present invention comprises the steps of:

receiving light incident from a human subject for each color component, to obtain a plurality of pieces of pixel data;

generating a raw image of the human subject employing the obtained plurality of pieces of pixel data;

generating a red signal image employing red pixel data, which are among the plurality of pieces of pixel data, obtained by receiving red components of light from the human subject;

generating a green signal image employing green pixel data, which are among the plurality of pieces of pixel data, obtained by receiving green components of light from the human subject;

judging the brightness of illumination during photography of the human subject;

detecting a facial image within the raw image by detecting the facial image within the red signal image in the case that the brightness of illumination is lower than a predetermined threshold value; and detecting a facial image within the raw image by detecting the facial image within the green signal image in the case that the brightness of illumination is greater than or equal to the predetermined threshold value.

A second photography apparatus of the present invention comprises:

imaging means, for receiving light incident from a human subject for each color component, to obtain a plurality of pieces of pixel data;

image generating means, for generating a raw image of the human subject employing the obtained plurality of pieces of pixel data, for generating a red signal image employing red pixel data, which are among the plurality of pieces of pixel data, obtained by receiving red components of light from the human subject, and for generating a green signal image employing green pixel data, which are among the plurality of pieces of pixel data, obtained by receiving green components of light from the human subject;

brightness judging means, for judging the brightness of illumination during photography of the human subject; and face detecting means, for detecting a facial image within the raw image by detecting the facial image within the red signal image in the case that the brightness of illumination is lower than a predetermined threshold value, and detecting a facial image within the raw image by detecting the facial image within the green signal image in the case that the brightness of illumination is greater than or equal to the predetermined threshold value.

A third face detecting method of the present invention comprises the steps of:

receiving light incident from a human subject for each color component, to obtain a plurality of pieces of pixel data;

generating a raw image of the human subject employing the obtained plurality of pieces of pixel data;

generating a red signal image employing red pixel data, which are among the plurality of pieces of pixel data, obtained by receiving red components of light from the human subject;

generating a brightness approximating signal image employing brightness approximating pixel data, which are pixel data of a color component which has luminosity that approximates brightness, from among the plurality of pieces of pixel data obtained by receiving light from the human subject;

judging whether illumination during photography of the human subject was provided by a tungsten light source;

detecting a facial image within the raw image by detecting the facial image within the red signal image in the case that it is judged that the illumination was provided by a tungsten light source; and detecting a facial image within the raw image by detecting the facial image within the brightness approximating signal image in the case that it is judged that the illumination was not provided by a tungsten light source.

A third photography apparatus of the present invention comprises:

imaging means, for receiving light incident from a human subject for each color component, to obtain a plurality of pieces of pixel data;

image generating means, for generating a raw image of the human subject employing the obtained plurality of pieces of pixel data, for generating a red signal image employing red pixel data, which are among the plurality of pieces of pixel data, obtained by receiving red components of light from the human subject, and for generating a brightness approximating signal image employing brightness approximating pixel data, which are pixel data of a color component which has luminosity that approximates brightness, from among the plurality of pieces of pixel data obtained by receiving light from the human subject;

illumination judging means, for judging whether illumination during photography of the human subject was provided by a tungsten light source; and face detecting means, for detecting a facial image within the raw image by detecting the facial image within the red signal image in the case that it is judged that the illumination was provided by a tungsten light source, and detecting a facial image within the raw image by detecting the facial image within the brightness approximating signal image in the case that it is judged that the illumination was not provided by a tungsten light source.

A fourth face detecting method of the present invention comprises the steps of:

receiving light incident from a human subject for each color component, to obtain a plurality of pieces of pixel data;

generating a raw image of the human subject employing the obtained plurality of pieces of pixel data;

generating a red signal image employing red pixel data, which are among the plurality of pieces of pixel data, obtained by receiving red components of light from the human subject;

generating a brightness approximating signal image employing brightness approximating pixel data, which are pixel data of a color component which has luminosity that approximates brightness, from among the plurality of pieces of pixel data obtained by receiving light from the human subject;

judging the brightness of illumination during photography of the human subject;

detecting a facial image within the raw image by detecting the facial image within the red signal image in the case that the brightness of illumination is lower than a predetermined threshold value; and detecting a facial image within the raw image by detecting the facial image within the brightness approximating signal image in the case that the brightness of illumination is greater than or equal to the predetermined threshold value.

A fourth photography apparatus of the present invention comprises:

imaging means, for receiving light incident from a human subject for each color component, to obtain a plurality of pieces of pixel data;

image generating means, for generating a raw image of the human subject employing the obtained plurality of pieces of pixel data, for generating a red signal image employing red pixel data, which are among the plurality of pieces of pixel data, obtained by receiving red components of light from the human subject, and for generating a brightness approximating signal image employing brightness approximating pixel data, which are pixel data of a color component which has luminosity that approximates brightness, from among the plurality of pieces of pixel data obtained by receiving light from the human subject;

brightness judging means, for judging the brightness of illumination during photography of the human subject; and face detecting means, for detecting a facial image within the raw image by detecting the facial image within the red signal image in the case that the brightness of illumination is lower than a predetermined threshold value, and detecting a facial image within the raw image by detecting the facial image within the brightness approximating signal image in the case that the brightness of illumination is greater than or equal to the predetermined threshold value.

Here, the brightness approximating signal image can be directly obtained from the imaging element. The image may be constituted by any color which is not brightness data but has luminosity that approximates brightness. An example of the brightness approximating signal image is an image constituted by white pixel data.

The face detecting means may detect facial images by any method, and may comprise, for example:

partial image generating means, for generating a plurality of partial images by scanning a subwindow, which is a frame surrounding a set number of pixels; and face classifiers, for performing final discrimination regarding whether the plurality of partial images represent faces, employing discrimination results of a plurality of weak classifiers.

Note that the face classifiers may be of any construction. For example, a configuration may be adopted, wherein:

the plurality of weak classifiers are arranged in a cascade structure; and discrimination is performed by downstream weak classifiers only on partial images which have been discriminated to represent faces by upstream weak classifiers.

The face detecting means may further comprise a candidate detecting means, for discriminating whether the partial images represent faces and detecting partial images that possibly represent faces as candidate images; and the face classifiers may discriminate whether the candidate images detected by the candidate detecting means represent faces.

The first face detecting method and the first photography apparatus of the present invention receive light incident from a human subject for each color component, to obtain a plurality of pieces of pixel data; generate a raw image of the human subject employing the obtained plurality of pieces of pixel data; generate a red signal image employing red pixel data, which are among the plurality of pieces of pixel data, obtained by receiving red components of light from the human subject; generate a green signal image employing green pixel data, which are among the plurality of pieces of pixel data, obtained by receiving green components of light from the human subject; judge whether illumination during photography of the human subject was provided by a tungsten light source; detect a facial image within the raw image by detecting the facial image within the red signal image in the case that it is judged that the illumination was provided by a tungsten light source; and detect a facial image within the raw image by detecting the facial image within the green signal image in the case that it is judged that the illumination was not provided by a tungsten light source. That is, the type of signal to be employed in face detection can be changed according to the wavelength properties of tungsten light sources. Therefore, deterioration of face detecting performance when illumination is provided by a tungsten light source can be prevented. In addition, the extraction of brightness data from the raw image becomes unnecessary, because face detection is performed using either the red signal image or the green signal image directly. Accordingly, the amount of calculations involved in the face detecting process can be reduced, and processing speeds can be improved.

The second face detecting method and the second photography apparatus of the present invention receive light incident from a human subject for each color component, to obtain a plurality of pieces of pixel data; generate a raw image of the human subject employing the obtained plurality of pieces of pixel data; generate a red signal image employing red pixel data, which are among the plurality of pieces of pixel data, obtained by receiving red components of light from the human subject; generate a green signal image employing green pixel data, which are among the plurality of pieces of pixel data, obtained by receiving green components of light from the human subject; judge the brightness of illumination during photography of the human subject; detect a facial image within the raw image by detecting the facial image within the red signal image in the case that the brightness of illumination is lower than a predetermined threshold value; and detect a facial image within the raw image by detecting the facial image within the green signal image in the case that the brightness of illumination is greater than or equal to the predetermined threshold value. That is, the type of signal to be employed in face detection can be changed according to the brightness of illumination during photography. Therefore, deterioration of face detecting performance when the brightness of illumination is low can be prevented. In addition, the extraction of brightness data from the raw image becomes unnecessary, because face detection is performed using either the red signal image or the green signal image directly. Accordingly, the amount of calculations involved in the face detecting process can be reduced, and processing speeds can be improved.

The third face detecting method and the third photography apparatus of the present invention receive light incident from a human subject for each color component, to obtain a plurality of pieces of pixel data; generate a raw image of the human subject employing the obtained plurality of pieces of pixel data; generate a red signal image employing red pixel data, which are among the plurality of pieces of pixel data, obtained by receiving red components of light from the human subject; generate a brightness approximating signal image employing green pixel data, which are among the plurality of pieces of pixel data, obtained by receiving components of light of a color, which has luminosity that approximates brightness, from the human subject; judge whether illumination during photography of the human subject was provided by a tungsten light source; detect a facial image within the raw image by detecting the facial image within the red signal image in the case that it is judged that the illumination was provided by a tungsten light source; and detect a facial image within the raw image by detecting the facial image within the brightness approximating signal image in the case that it is judged that the illumination was not provided by a tungsten light source. That is, the type of signal to be employed in face detection can be changed according to the wavelength properties of tungsten light sources. Therefore, deterioration of face detecting performance when illumination is provided by a tungsten light source can be prevented. In addition, the extraction of brightness data from the raw image becomes unnecessary, because face detection is performed using either the red signal image or the brightness approximating signal image directly. Accordingly, the amount of calculations involved in the face detecting process can be reduced, and processing speeds can be improved.

The fourth face detecting method and the fourth photography apparatus of the present invention receive light incident from a human subject for each color component, to obtain a plurality of pieces of pixel data; generate a raw image of the human subject employing the obtained plurality of pieces of pixel data; generate a red signal image employing red pixel data, which are among the plurality of pieces of pixel data, obtained by receiving red components of light from the human subject; generate a brightness approximating signal image employing brightness approximating pixel data, which are among the plurality of pieces of pixel data, obtained by receiving components of light of a color, which has luminosity that approximates brightness, from the human subject; judge the brightness of illumination during photography of the human subject; detect a facial image within the raw image by detecting the facial image within the red signal image in the case that the brightness of illumination is lower than a predetermined threshold value; and detect a facial image within the raw image by detecting the facial image within the green signal image in the case that the brightness of illumination is greater than or equal to the predetermined threshold value. That is, the type of signal to be employed in face detection can be changed according to the brightness of illumination during photography. Therefore, deterioration of face detecting performance when the brightness of illumination is low can be prevented. In addition, the extraction of brightness data from the raw image becomes unnecessary, because face detection is performed using either the red signal image or the brightness approximating signal image directly. Accordingly, the amount of calculations involved in the face detecting process can be reduced, and processing speeds can be improved.

Note that a configuration may be adopted, wherein the face detecting means comprises partial image generating means, for generating a plurality of partial images by scanning a subwindow, which is a frame surrounding a set number of pixels; and face classifiers, for performing final discrimination regarding whether the plurality of partial images represent faces, employing discrimination results of a plurality of weak classifiers. In this case, detection of facial images can be performed efficiently and accurately.

Note that a configuration may be adopted, wherein: the plurality of weak classifiers are arranged in a cascade structure; and discrimination is performed by downstream weak classifiers only on partial images which have been discriminated to represent faces by upstream weak classifiers. In this case, the number of partial images to be discriminated by downstream weak classifiers can be greatly reduced. Accordingly, the discriminating process can be further expedited.

DESCRIPTION OF THE PREFERRED EMBODIMENTS

Figure 1:
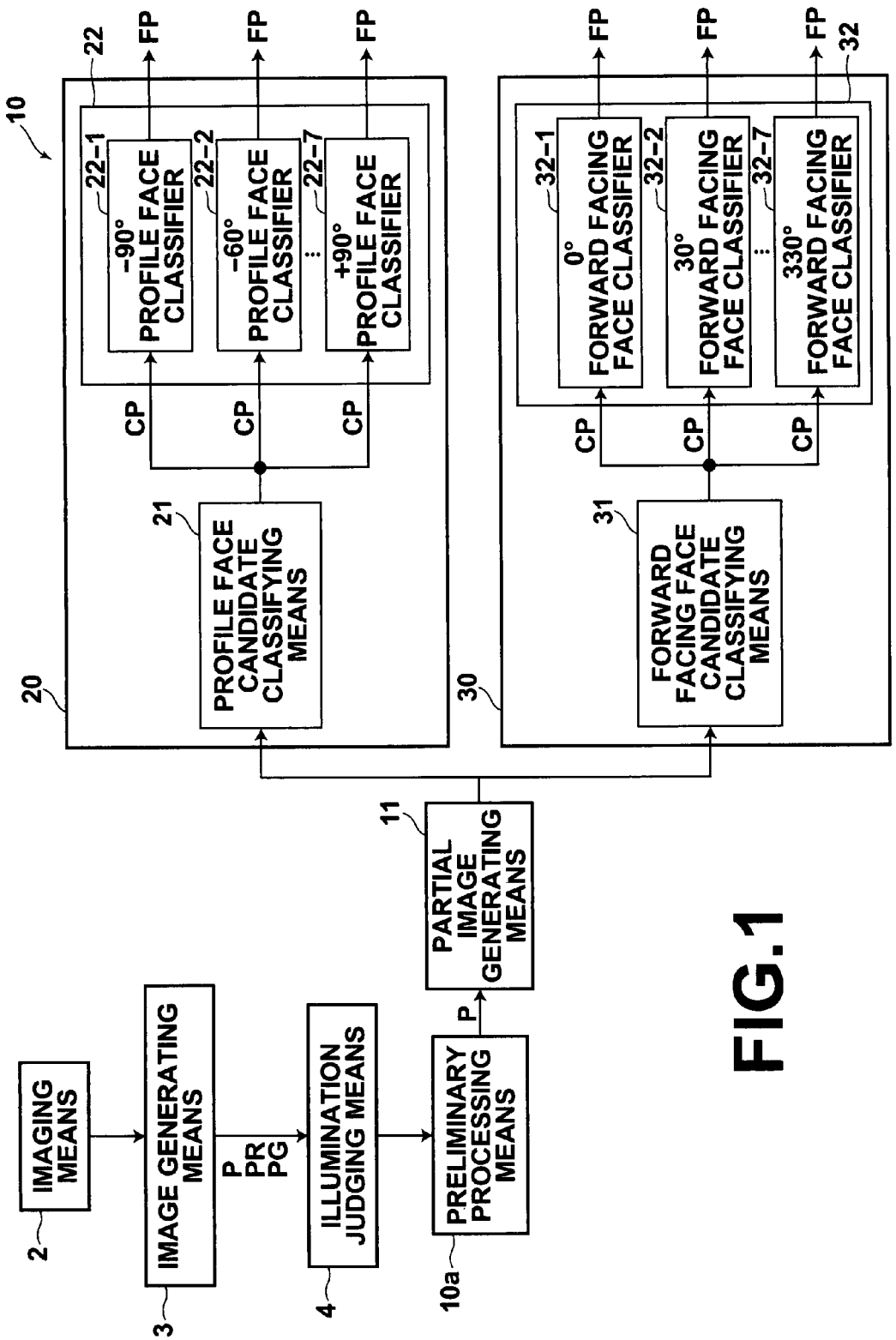
FIG. 1 is a schematic block diagram that illustrates the construction of a photography apparatus according to an embodiment of the present invention.

Hereinafter, embodiments of the present invention will be described with reference to the attached drawings. FIG. 1 is a schematic block diagram that illustrates the construction of a photography apparatus 1 according to a first embodiment of the present invention. The photography apparatus 1 is a digital camera, for example, and comprises: an imaging means 2, for obtaining a plurality of pieces of pixel data by receiving light from human subjects with a plurality of light receiving elements 2a for each color component; an image generating means 3, for generating raw images P and green signal images PG of the human subjects employing the plurality of pieces of pixel data; an illumination judging means 4, for judging whether illumination during photography is provided by a tungsten light source; and a face detecting means 10, for detecting faces within the generated images.

Figure 2A:
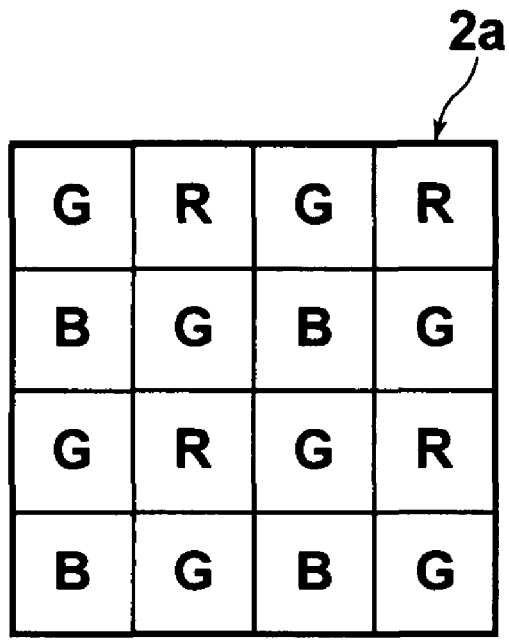
FIGS. 2A and 2B are schematic diagrams that illustrate examples of arrangements of light receiving elements within an imaging means of the photography apparatus of FIG. 1.
Figure 2B:
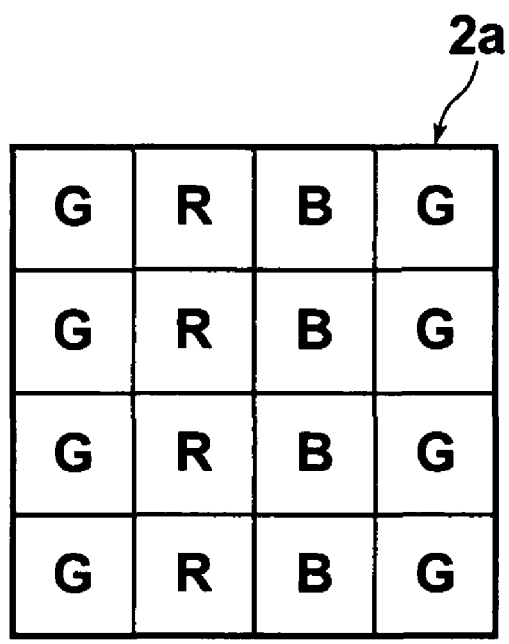

As illustrated in FIG. 2A, the imaging means 2 comprises the plurality of light receiving elements 2a for receiving light from human subjects for each color component (RGB). Each light receiving element 2a receives light of a particular color component, and obtains pixel data Px by photoelectric conversion. In the case that the light receiving elements 2a are provided in the so-called Bayer fashion, as illustrated in FIG. 2a, the light receiving elements 2a for receiving green components of light are arranged at a predetermined pitch, and thinned out green pixel data can be obtained thereby. Note that the arrangement of the light receiving elements of the imaging means 2 may be in the form of stripes, as illustrated in FIG. 2B. Further, the light receiving elements 2a may be arranged in the shape of a honeycomb.

The image generating means 3 generates images employing the pixel data obtained by the imaging means 2. The image generating means 3 generates raw images P, which are color images that employ the plurality of pieces of pixel data for RGB (or CYMG) components, red signal images PR, which are images that only employ the pieces of pixel data for red components, and green signal images PG, which are images that only employ the pieces of pixel data for green components. Note that because the light receiving elements 2a for receiving the red components and the green components of light are provided in a predetermined arrangement as illustrated in FIGS. 2A and 2B, the image generating means 3 is capable of generating two dimensional red signal images PR and two dimensional green signal images PG.

The illumination judging means 4 judges whether the light source used during photography is a tungsten light source, by judging whether "tungsten light source" is selected from a light source selection menu of the digital camera. Alternatively, the illumination judging means 4 may judge whether the light source used during photography is a tungsten light source, by analyzing the color of an image obtained by the imaging means 2 and judging whether the properties of tungsten light sources, that is, that a red wavelength band is higher than a blue wavelength band, are present within the image. In the case that the illumination judging means 4 judges that the light source used during photography is a tungsten light source, the raw image P and the red signal image PR are output to the face detecting means 10. In the case that the illumination judging means 4 judges that the light source used during photography is not a tungsten light source, the raw image P and the green signal image PG are output to the face detecting means 10.

The face detecting means 10 administers a face detecting process that employs an AdaBoosting algorithm or the like onto the green signal image PG or the red signal image PR, output thereto from the illumination judging means 4. The face detecting means 10 comprises: a partial image generating means 11, for scanning a subwindow W over the green signal image PG or the red signal image PR to generate partial images PP; a profile face detecting means 20, for detecting partial images that represent faces in profile; and forward face detecting means 30, for detecting partial images that represent faces facing forward.

Preliminary processes are administered on the green signal images PG or the red signal images PR by a preliminary processing means 10a, prior to the green signal images P or the red signal images PR being input to the partial image generating means 11. Because RGB signals output by CCD's are proportionate to light intensity, the preliminary processing means 10a administers gamma conversion on the RGB signals to approach contrast as perceived by humans. Specifically, the preliminary processing means 10a generates gamma converted green signals or gamma converted red signals by administering conversion, such as green signal value=log(G), red signal value=log(R), green signal value=$G^{2.2}$, red signal value=$R^{2.2}$, or conversion according to a lookup table. Further, the preliminary processing means 10a generates a plurality of green signal images PG or a plurality of red signal images PR having different resolutions, from the green signal images PG or the red signal images PR, as illustrated in FIGS. 3A through 3D. Still further, the preliminary processing means 10a administers a normalizing process (hereinafter, referred to as a "local normalizing process") that suppresses fluctuations in contrast within local regions of the plurality of green signal images PG or the red signal images PR, across the entireties of the green signal images PG or the red signal images PR.

Figure 3A:
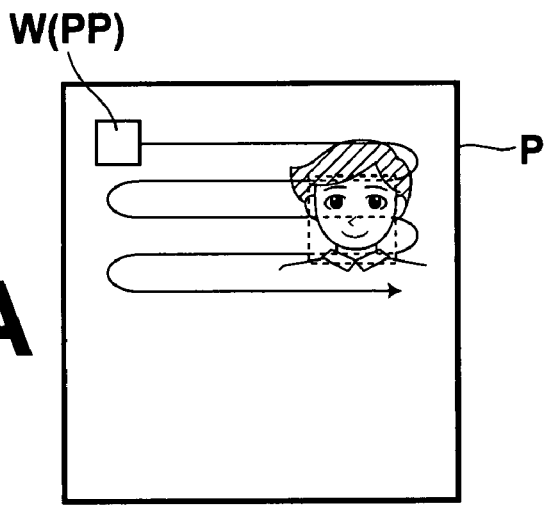
FIGS. 3A, 3B, 3C, and 3D are diagrams that illustrate how a partial image generating means of FIG. 1 scans subwindows.

As illustrated in FIG. 3A, the partial image generating means 11 scans the subwindow W having a set number of pixels (32 pixels by 32 pixels, for example) within the entire green signal image PG or the entire red signal image PR, and cuts out regions surrounded by the subwindow W to generate the partial images PP having a set number of pixels.

Figure 3B:
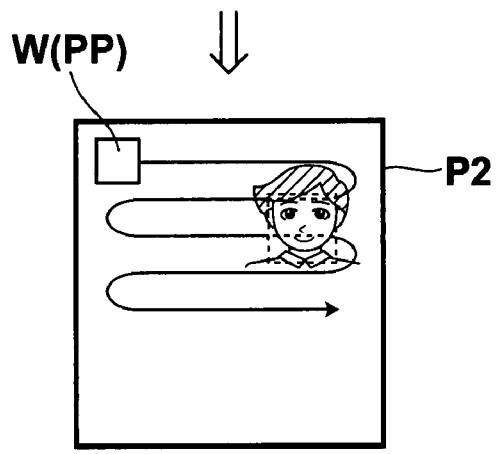
Figure 3C:
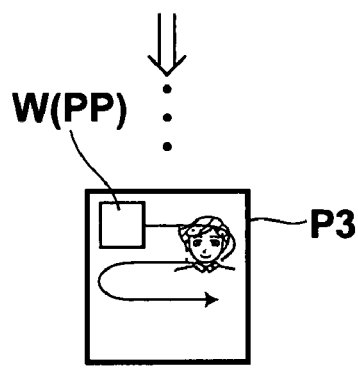
Figure 3D:
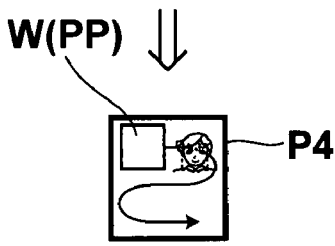

Note that the partial image generating means 11 also generates partial images PP by scanning the subwindow W within the generated lower resolution images as well, as illustrated in FIGS. 3B through 3D. Thereby, even in the case that a face (discrimination target) pictured in the green signal image PG or the red signal image PR does not fit within the subwindow W, it becomes possible to fit the face within the subwindow W in a lower resolution image. Accordingly, faces can be positively detected.

The profile face detecting means 20 detects partial images that represent faces in profile from among the plurality of partial images PP. The profile face detecting means 20 comprises a profile face candidate classifying means 21, and a profile face classifying means 22. The profile face candidate classifying means 21 discriminates whether each of the plurality of partial images PP represent faces in profile, and outputs partial images PP that possibly represent faces in profile to the profile face classifying means 22, as candidate images CP. The profile face classifying means 22 discriminates whether each of the candidate images CP detected by the profile face candidate classifying means 21 and output thereto represent faces in profile.

Figure 4:
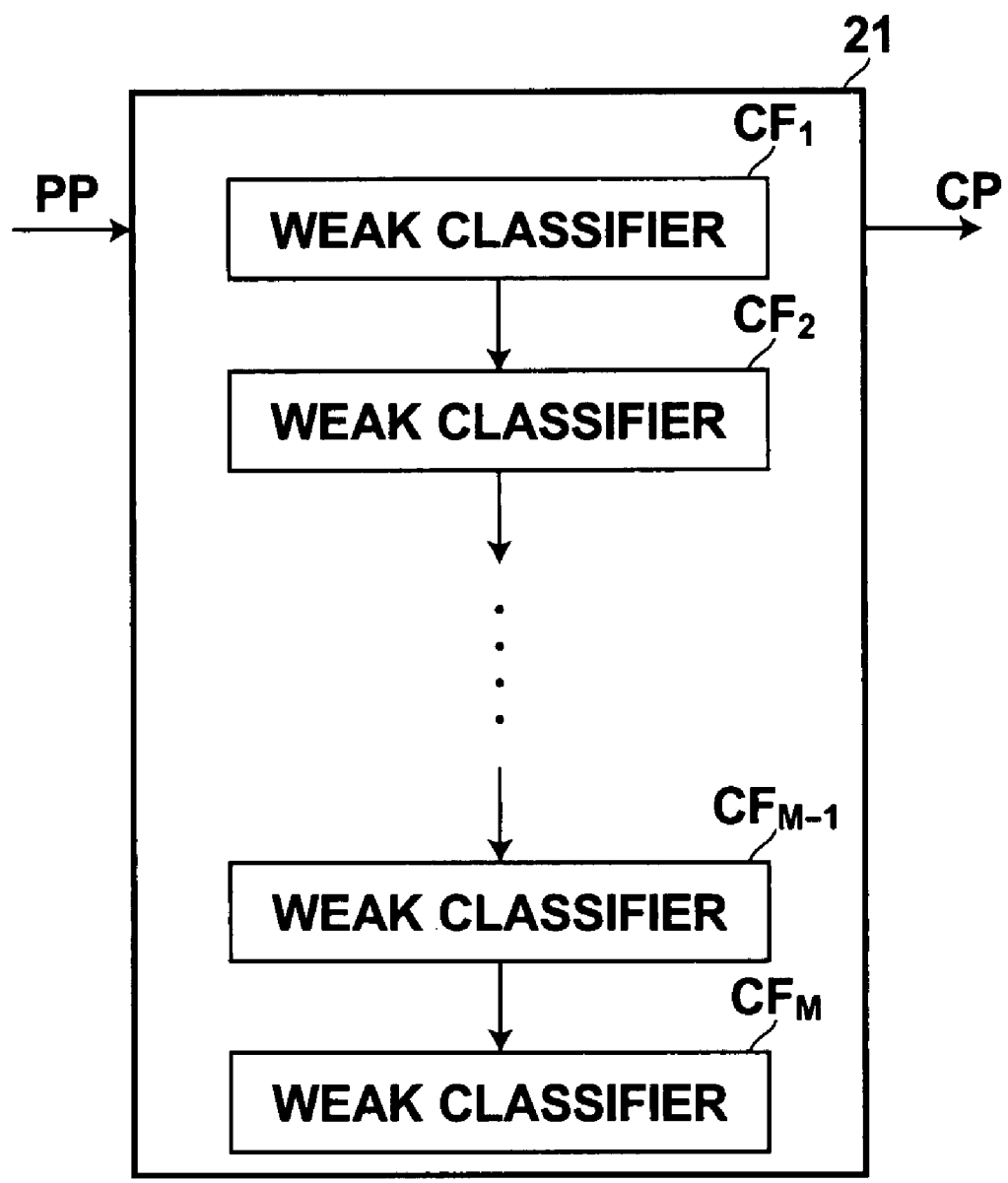
FIG. 4 is a block diagram that illustrates an example of a candidate classifier.
Figure 5:
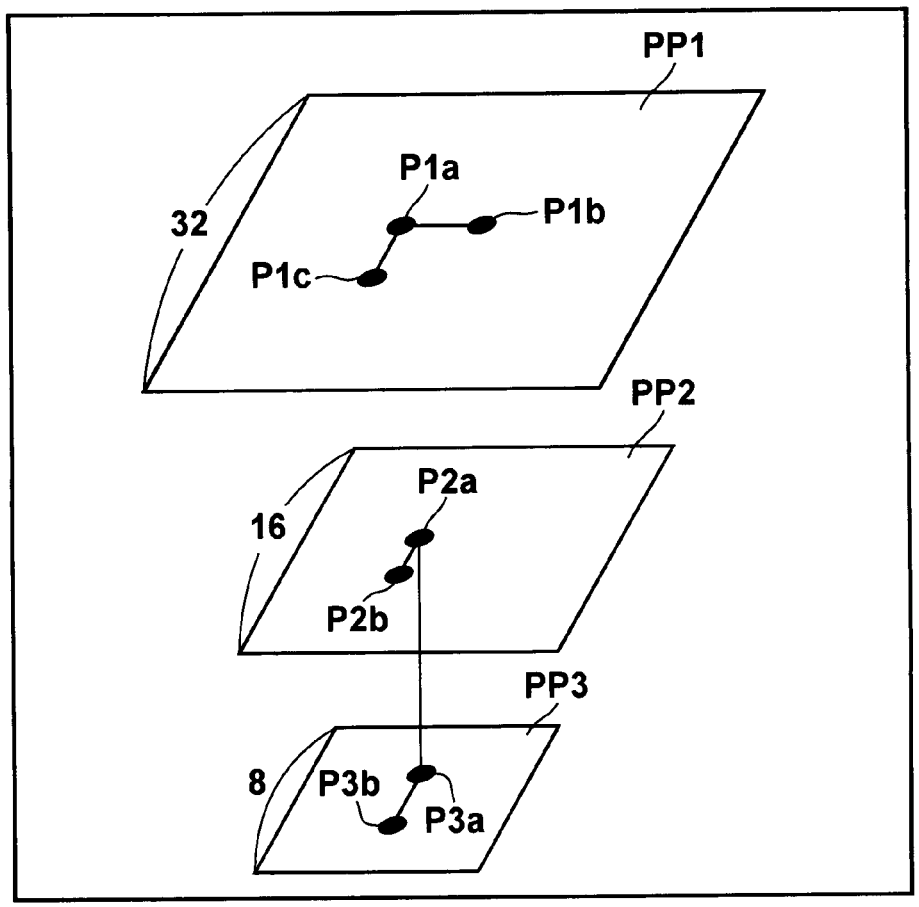
FIG. 5 is a diagram that illustrates how characteristic amounts are extracted from partial images, by the candidate classifier of FIG. 4.

The profile face candidate classifying means 21 functions to perform binary discrimination regarding whether the partial images PP represent faces in profile, and comprises a plurality of classifiers, each constituted by weak classifiers $CF_1$ through $CF_M$ (M is the number of weak classifiers), as illustrated in FIG. 4. The profile face candidate classifying means 21 is that which has performed learning by the AdaBoosting algorithm, and comprises the plurality of weak classifiers $CF_1$ through $CF_M$. Each of the weak classifiers $CF_1$ through $CF_M$ extracts characteristic amounts x from the partial images PP, and discriminates whether the partial images PP represent faces employing the characteristic amounts x. The profile face candidate classifying means 21 performs final judgment regarding whether the partial images PP represent faces, employing the discrimination results of the weak classifiers $CF_1$ through $CF_M$.

Specifically, each of the weak classifiers $CF_1$ through $CF_M$ extracts green signal values or red signal values of coordinate positions P1a, P1b, and P1c within the partial images PP, as illustrated in FIG. 4. Further, green signal values or red signal values of coordinate positions P2a, P2b, P3a, and P3b are extracted from lower resolution images PP2 and PP3 of the partial images PP, respectively. Thereafter, the seven coordinate positions P1a through P3b are combined as pairs, and the differences in green signal values or red signal values of each of the pairs are designated to be the characteristic amounts x. Each of the weak classifiers $CF_1$ through $CF_M$ employs different characteristic amounts. For example, the weak classifier $CF_1$ employs the difference in green signal values or red signal values between coordinate positions P1a and P1c as the characteristic amount x, while the weak classifier $CF_2$ employs the difference in green signal values or red signal values between coordinate positions P2a and P2b as the characteristic amount x.

Note that a case has been described in which each of the weak classifiers $CF_1$ through $CF_M$ extracts characteristic amounts x. Alternatively, the characteristic amounts x may be extracted in advance for a plurality of partial images PP, then input into each of the weak classifiers $CF_1$ through $CF_M$.

Figure 6:
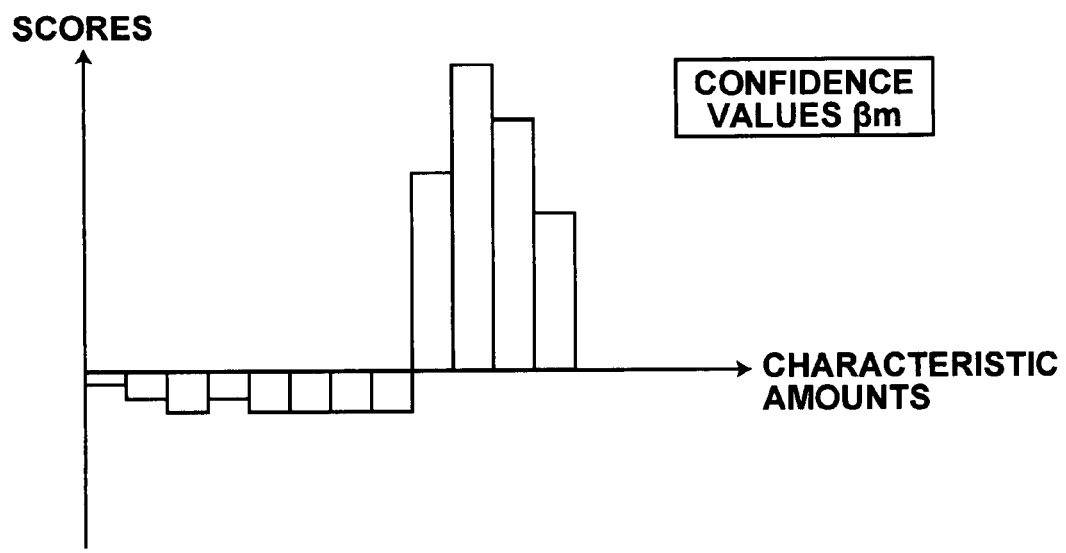
FIG. 6 is a graph that illustrates an example of a histogram of the weak classifier of FIG. 4.

Each of the weak classifiers $CF_1$ through $CF_M$ has a histogram such as that illustrated in FIG. 6. The weak classifiers $CF_1$ through $CF_M$ output scores f1(x) through $f_M(x)$ according to the values of the characteristic amounts x based on these histograms. Further, the weak classifiers $CF_1$ through $CF_M$ have confidence values $\beta_1$ through $\beta_M$ that represent the levels of discrimination performance thereof. The weak classifiers $CF_1$ through $CF_M$ calculate discrimination scores $\beta_M \cdot f_M(x)$ by multiplying the scores f1(x) through $f_M(x)$ by the confidence values $\beta_1$ through $\beta_M$. Whether the discrimination score $\beta_M \cdot f_M(x)$ of each weak classifier $CF_M$ is greater than or equal to a threshold value Sref is judged. A partial image PP is judged to represent a face when the discrimination score $\beta_M \cdot f_M(x)$ is equal to or greater than the threshold value Sref ($\beta_M \cdot f_M(x) \geq$ Sref).

The weak classifiers $CF_1$ through $CF_M$ of the profile face candidate classifying means 21 are configured in a cascade structure. Only partial images PP which have been judged to represent faces by all of the weak classifiers $CF_1$ through $CF_M$ are output as candidate images CP. That is, discrimination is performed by a downstream weak classifier $CF_{m+1}$ only on partial images in which faces have been discriminated by the weak classifier $CF_m$. Partial images PP in which faces have not been discriminated by the weak classifier $CF_m$ are not subjected to discrimination operations by the downstream weak classifier $CF_{m+1}$. The number of partial images PP to be discriminated by the downstream weak classifiers can be reduced by this structure, and accordingly, the discrimination operations can be accelerated.

Note that in the case described above, each of the discrimination scores $\beta_M \cdot f_M(x)$ are individually compared against the threshold value Sref to judge whether a partial image PP represents a face. Alternatively, discrimination maybe performed by comparing the sum $\Sigma_{r=1}^{m} \beta_r \cdot f_r(X)$ of the discrimination scores of upstream weak classifiers $CF_1$ through $CF_{m-1}$ against a predetermined threshold value S1ref ($\Sigma_{r=1}^{m} \beta_r \cdot f_r(x) \geq$ S1ref). The discrimination accuracy can be improved by this method, because judgment can be performed while taking the discrimination scores of upstream weak classifiers into consideration.

Next, the profile face classifying means 22 will be described with reference to FIG. 1. The profile face classifying means 22 comprises: a 0° profile face classifier 22-1, for discriminating faces in which the direction that the face is facing within the image (angle) is 0°, that is, forward facing faces; a 30° profile face classifier 22-2, for discriminating faces in which the aforementioned angle is 30°; and profile face classifiers, for discriminating faces in which the aforementioned angle is within a range of −90° to +90°, in 30° increments. That is, the profile face classifying means 22 comprises a total of 7 classifiers 22-1 through 22-7. Note that for example, the 0° out-of-plane rotated face classifier 22-1 is capable of discriminating faces which are rotated within a range of −15° to +15° with the center of rotational angular range being 0°. Note that each of the plurality of profile face classifiers 22-1 through 22-7 comprises a plurality of weak classifiers which have performed learning by the AdaBoosting algorithm, similar to those of the profile face candidate classifying means 21 (refer to FIG. 4). The profile face classifying means 22 performs discrimination by the same discrimination method as that employed by the profile face candidate classifying means 21.

Next, the forward facing face detecting means 30 will be described. The forward facing face detecting means 30 detects partial images PP that represent forward facing faces from among the plurality of partial images PP. The forward facing face detecting means 30 comprises a forward facing face candidate classifying means 31, and a forward facing face classifying means 32. The forward facing face candidate classifying means 31 discriminates whether each of the plurality of partial images PP represent forward facing faces, and outputs partial images PP that possibly represent forward facing faces to the forward facing face classifying means 32, as candidate images CP. The forward facing face classifying means 32 discriminates whether each of the candidate images CP detected by the forward facing face candidate classifying means 31 and output thereto represent forward facing faces.

The forward facing face candidate classifying means 31 functions to perform binary discrimination regarding whether the partial images PP represent forward facing faces. The forward facing face classifying means 31 comprises a plurality of classifiers, each constituted by weak classifiers which have performed learning by the AdaBoosting algorithm, similar to the profile face candidate classifying means 21 (refer to FIG. 4).

The forward facing face classifying means 32 comprises: a 0° forward facing face classifier 32-1, for discriminating faces in which the angle formed by the center lines thereof and the vertical direction of the images that they are pictured in is 0°; a 30° forward facing face classifier 32-2, for discriminating faces in which the aforementioned angle is 30°; and in-plane rotated face classifiers 32-3 through 32-12, for discriminating faces in which the aforementioned angle is within a range of 30° to 330°, in 30° increments. Note that for example, the 0° in-plane rotated face classifier 32-1 is capable of discriminating faces which are rotated within a range of −15° (=345°) to +15° with the center of rotational angular range being 0°. Because the raw images P0 and the green signal images P are of the same subjects, faces are present within the same regions in the raw images P as in the green signal images P. Accordingly, the face detecting means 10 is capable of detecting facial images FP within the raw images P, by detecting the facial images FP within the green signal images PG or the red signal images PR.

Note that each of the plurality of forward facing face classifiers 32-1 through 32-12 comprises a plurality of weak classifiers which have performed learning by the boosting algorithm, similar to those of the aforementioned profile face candidate classifying means 21 (refer to FIG. 4). The forward facing face classifying means 32 performs discrimination by the same discrimination method as that employed by the profile face candidate classifying means 21.

Accuracy of face detection can be improved, by changing the type of signal to be employed in face detection according to the type of light source used during photography. Tungsten light sources emit light having a lower color temperature compared to other light sources, such as natural sunlight. Light emitted from tungsten light sources is characterized by having relatively lower blue colored light energy than red colored light energy. Therefore, if the same detection method as that used for images photographed with natural sunlight as the light source is used for images photographed with tungsten light sources as the light source, the detection accuracy deteriorates. Accordingly, face detection is performed employing the red signal image PR in the case that the light source is a tungsten light source, and employing the green signal image PG in the case that the light source is not a tungsten light source, as described above. Thereby, highly accurate face detection can be realized, regardless of the type of light source that provided illumination during photography.

In addition, faces are not judged employing brightness data (Y signals) as in conventional methods, but rather employing the red signal image PR or the green signal image PG. Conventionally, brightness data are employed as signals to discriminate faces. In this case, fluctuations in face detection due to individual differences such as skin color can be eliminated. However, data conversion based on human visual perception must be performed when extracting brightness data from RGB signals, according to the formula:

Brightness $Y=0.299R+0.587G+0.114B$

Figure 7:
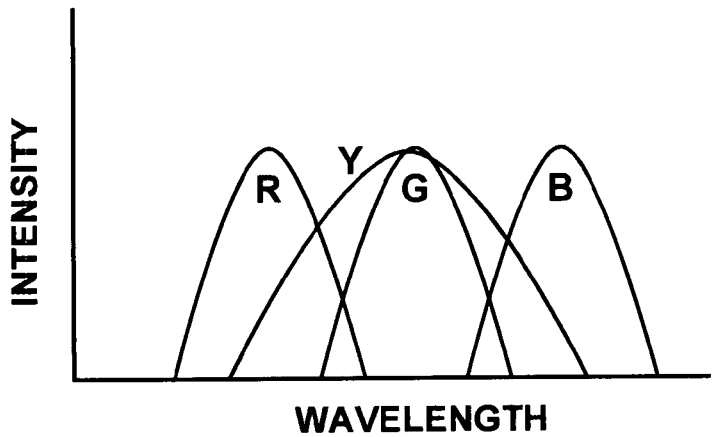
FIG. 7 is a graph that illustrates the relationships among RGB signals and brightness data.

Meanwhile, as illustrated in FIG. 7 and in the above formula, the component of RGB signals of the partial images PP that includes the most brightness data is the green signal, and in the case of an image photographed with a tungsten light source providing illumination, the component that includes the most brightness data is the red signal. The weak classifiers of the face detecting means 10 focus on this point, and employ the green signal images PG or the red signal images PR to perform discrimination. Therefore, the detection performance is substantially at the same level as that of conventional face detection employing brightness data, while the conversion process from RGB signals to brightness data becomes unnecessary. Accordingly, the face detection process can be accelerated.

Figure 8:
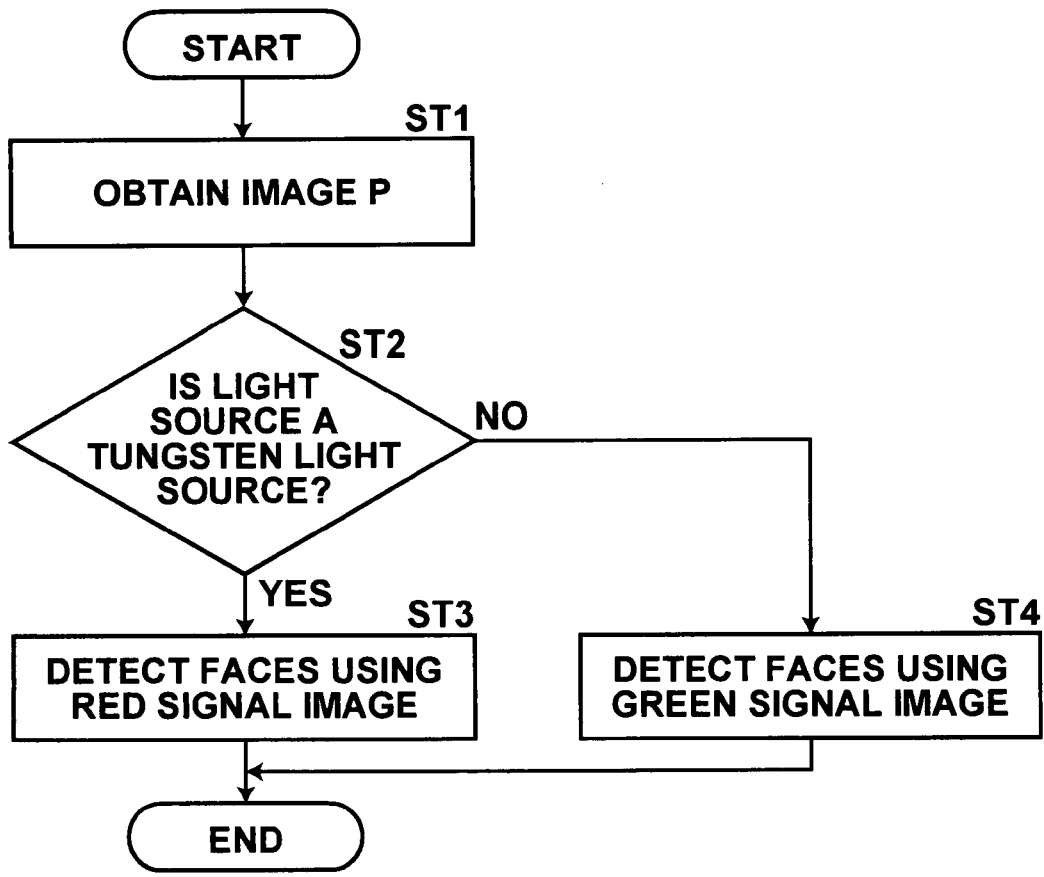
FIG. 8 is a flow chart that illustrates a preferred embodiment of the face detecting method of the present invention.

FIG. 8 is a flow chart that illustrates a preferred embodiment of the face detecting method of the present invention. The steps of the face detecting method will be described with reference to FIGS. 1 through 8. First, the imaging means 2 performs imaging of a human subject, and obtains an image P (step ST1). At the same time, the illumination judging means 4 judges whether the light source that provides illumination is a tungsten light source (step ST2). In the case that it is judged that illumination is provided by a tungsten light source, face detection is performed based on the red signal image PR (step ST3). On the other hand, in the case that it is judged that illumination is not provided by a tungsten light source, face detection is performed based on the green signal image PG (step ST4). Thereby, a facial image FP that represents a forward facing face or a face in profile is discriminated within the raw image P.

Figure 9:
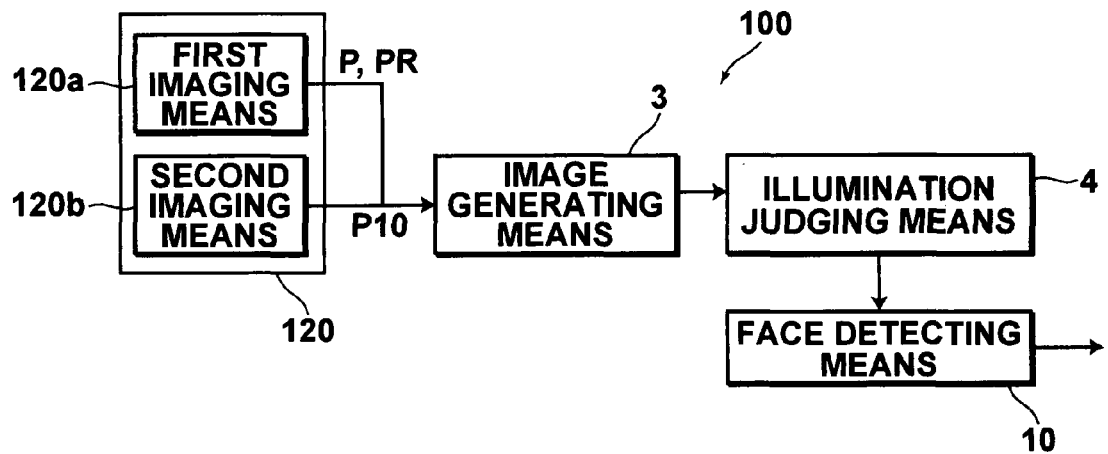
FIG. 9 is a block diagram that illustrates the construction of a photography apparatus according to a second embodiment of the present invention.

FIG. 9 is a schematic block diagram that illustrates the construction of a photography apparatus 100 according to a second embodiment of the present invention. The photography apparatus 100 will be described with reference to FIG. 9. Note that components of the photography apparatus 100 which are the same as those of the photography apparatus 1 of FIG. 1 are denoted with the same reference numerals, and detailed descriptions thereof will be omitted insofar as they are not particularly necessary.

Figure 10A:
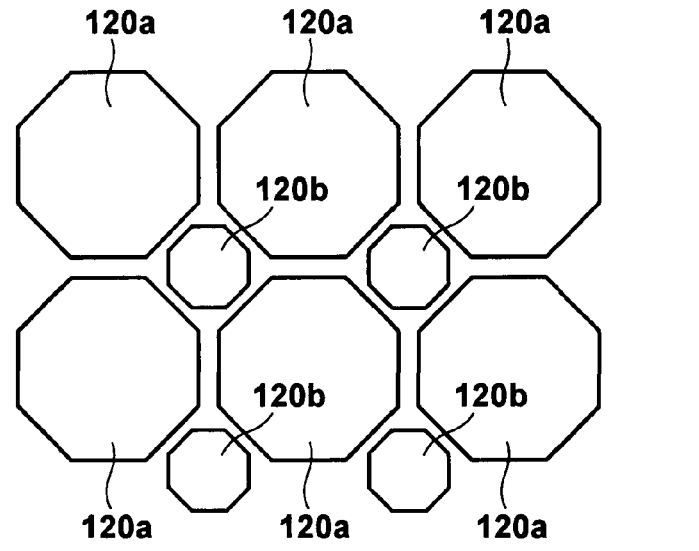
FIGS. 10A and 10B are schematic diagrams that illustrate first light receiving elements and second light receiving elements of the photography apparatus of FIG. 9.
Figure 11:
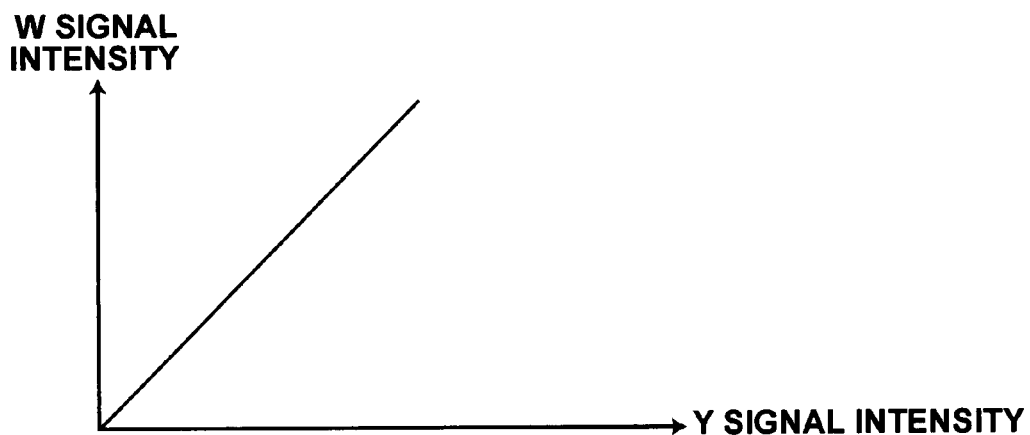
FIG. 11 is a graph that illustrates the correlation between brightness data and brightness approximating signals.

The photography apparatus 100 of FIG. 9 differs from the photography apparatus 1 of FIG. 1 in the construction of the imaging means thereof and the method of face detection in the case that illumination is judged to be provided by a tungsten light source. Specifically, an imaging means 120 of the photography apparatus 100 is of a so-called "honeycomb plus" configuration, as illustrated in FIG. 10A. The imaging means 120 comprises a plurality of first light receiving elements 120a, and a plurality of second light receiving elements 120b, which has smaller light receiving areas than the first light receiving elements 120a. The plurality of first receiving elements 120a and the plurality of second light receiving elements 2b are configured to photograph the same human subject. Here, the first light receiving elements 120a receive incident light, and performs photoelectric conversion to obtain RGB pixel data. Meanwhile, the second light receiving elements 120b receive white signals from among the components included in incident light to obtain brightness approximating data. The term "brightness approximating data" refers to images constituted by signals which are not brightness signals (Y signals), but are directly obtainable from the second light receiving elements and approximate brightness data (Y signals). An example of the brightness approximating data is the aforementioned white signal. The white signals increase proportionate to brightness data (Y signals) regardless of wavelength band, as illustrated in the graph of FIG. 11, and differs from the wavelength bands of RGB, on which the intensities of Y signals depend (refer to FIG. 7).

Figure 10B:
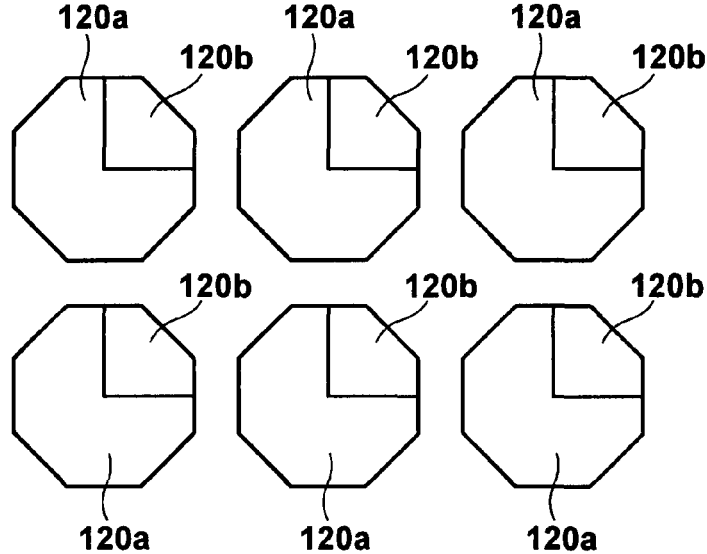

Note that the imaging means 120 maybe configured in a so-called "double honeycomb" configuration, in which the first light receiving elements 120a and second light receiving elements 120b, which have smaller light receiving areas than the first light receiving elements 120a, together form each honeycomb shape, as illustrated in FIG. 10B.

The image generating means 3 generates a raw image P from the pixel data obtained by the first light receiving elements 120a, and generates a brightness approximating signal image P10 from the brightness approximating pixel data obtained by the second light receiving elements 120b.

In the case that the illumination judging means 4 judges that the light source used during photography is a tungsten light source, a red signal image PR is output to the face detecting means 10, and the face detecting means 10 performs face detection employing the red signal image PR. In the case that the illumination judging means 4 judges that the light source used during photography is not a tungsten light source, the brightness approximating signal image P10 is output to the face detecting means 10, and the face detecting means 10 performs face detection employing the brightness approximating signal image P10.

Thereby, signal processing to extract brightness data (Y signals) from the RGB signals becomes unnecessary, and the processing speed of face detection can be improved. In addition, because face detection is performed based on data that approximates brightness, deterioration of detection accuracy can be suppressed.

Figure 12:
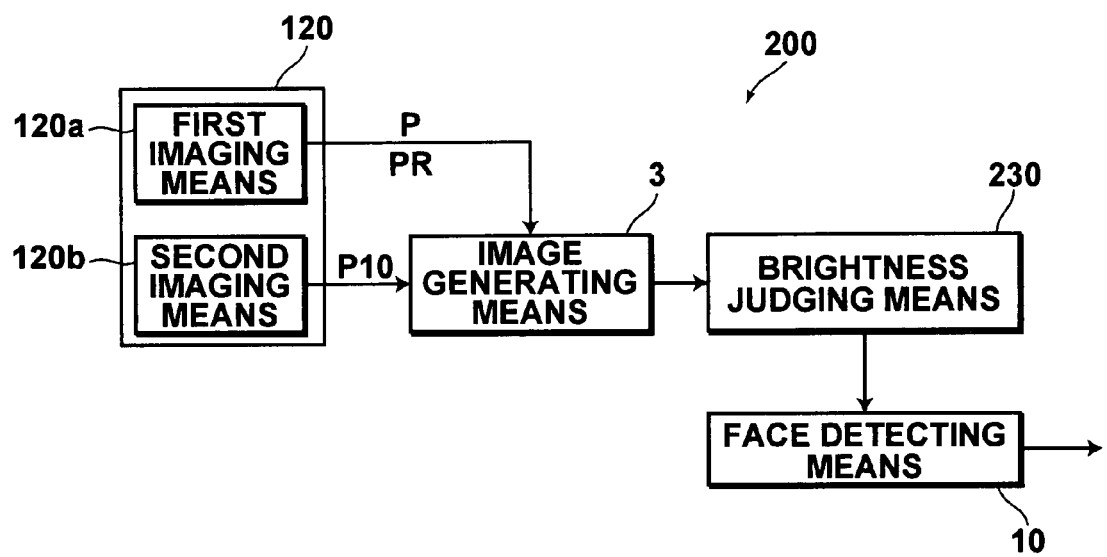
FIG. 12 is a block diagram that illustrates the construction of a photography apparatus according to a third embodiment of the present invention.

FIG. 12 is a schematic block diagram that illustrates the construction of a photography apparatus 200 according to a third embodiment of the present invention. The photography apparatus 200 will be described with reference to FIG. 12. Note that components of the photography apparatus 200 which are the same as those of the photography apparatus 1 of FIG. 1 are denoted with the same reference numerals, and detailed descriptions thereof will be omitted insofar as they are not particularly necessary.

The photography apparatus 200 of FIG. 12 differs from the photography apparatus 100 of FIG. 9 in that the type of signal employed for face detection is changed based on the brightness of illumination during photography, and not by the type of light source. That is, the photography apparatus 200 comprises a brightness judging means 230 instead of the illumination judging means, and the type of signal employed for face detection is determined, based on the judgment results obtained by the brightness judging means 230. Here, the brightness judging means 230 may judge the brightness by referring to the mode setting of the photography apparatus 200, or by referring to whether flash was used during photography. In the case that the brightness judging means 230 judges that the brightness is lower than a predetermined threshold value, a raw image P and a red signal image PR are output to the face detecting means 10, and the face detecting means 10 performs face detection employing the red signal image PR. In the case that the brightness judging means 230 judges that the brightness is greater than or equal to the predetermined threshold value, the raw image P and a brightness approximating signal image P10 are output to the face detecting means 10, and the face detecting means 10 performs face detection employing the brightness approximating signal image P10.

Note that in the photography apparatus 200, the brightness approximating signal image P10 is employed for face detection in the case that the brightness is judged to be greater than or equal to the predetermined threshold value. Alternatively, the green signal image PG may be employed in this case, as in the photography apparatus 1 of the first embodiment. In this case as well, the accuracy of face detection can be improved, by changing the type of signal employed for face detection according to the brightness during photography. That is, when the value of brightness (Y signals) is low, the brightness depends greatly on red signal values, and depends greatly on green signal values when the value of brightness is high, as illustrated in FIG. 7. Therefore, face detection is performed employing the red signal image PR in the case that the brightness is less than the predetermined threshold value, and employing the green signal image in the case that the brightness is greater than or equal to the predetermined threshold value. Thereby, highly accurate detection can be realized both when the brightness is low and when the brightness is high. In this case, the imaging means need not be that comprising the second light receiving elements 120b as illustrated in FIG. 10, and a standard CCD or the like may be employed.

According to the embodiments described above, the type of signal to be employed in face detection is changed according to the type of light source or the brightness during photography. Therefore, deterioration of face detecting performance when illumination is provided by a tungsten light source can be prevented. In addition, the extraction of brightness data from the raw image becomes unnecessary, because face detection is performed using either the red signal image PR, the green signal image PG, or the brightness approximating signal image P10 directly. Accordingly, the processing speed of the face detecting process can be improved.

Note that the plurality of weak classifiers $CF_1$ through $CF_m$ are arranged in a cascade structure; and discrimination is performed by downstream weak classifiers only on partial images PP which have been discriminated to represent faces by upstream weak classifiers. Therefore, the number of partial images PP to be discriminated by downstream weak classifiers can be greatly reduced. Accordingly, the discriminating process can be further accelerated.

Further, the face detecting means 10 comprises the candidate classifying means 21 and 31, for discriminating whether the partial images PP generated by the partial image generating means 11 represent faces and detecting partial images PP that possibly represent faces as candidate images CP. The face classifiers 22 and 32 discriminate whether the candidate images CP detected by the candidate classifying means 21 and 31 represent faces. Therefore, the number of partial images PP to be discriminated by the face classifiers 22 and 32 is reduced. Accordingly, the discriminating process can be further accelerated.

The present invention is not limited to the embodiments described above. For example, in the above embodiments, the candidate classifiers 21 and 31 are provided, as illustrated in FIG. 1. However, the face classifiers 22 and 32 may directly detect faces from within the partial images PP.

What is claimed is:

1. A face detecting method, comprising the steps of:
receiving light incident from a human subject for each color component, to obtain a plurality of pieces of pixel data;
generating a raw image of the human subject employing the obtained plurality of pieces of pixel data;
generating a red signal image employing red pixel data, which are among the plurality of pieces of pixel data, obtained by receiving red components of light from the human subject;
generating a green signal image employing green pixel data, which are among the plurality of pieces of pixel data, obtained by receiving green components of light from the human subject;
judging whether illumination during photography of the human subject was provided by a tungsten light source;
detecting a facial image within the raw image by detecting the facial image within the red signal image in the case that it is judged that the illumination was provided by a tungsten light source; and
detecting a facial image within the raw image by detecting the facial image within the green signal image in the case that it is judged that the illumination was not provided by a tungsten light source.

2. A face detecting method, comprising the steps of:
receiving light incident from a human subject for each color component, to obtain a plurality of pieces of pixel data;
generating a raw image of the human subject employing the obtained plurality of pieces of pixel data;
generating a red signal image employing red pixel data, which are among the plurality of pieces of pixel data, obtained by receiving red components of light from the human subject;
generating a green signal image employing green pixel data, which are among the plurality of pieces of pixel data, obtained by receiving green components of light from the human subject;
judging the brightness of illumination during photography of the human subject;
detecting a facial image within the raw image by detecting the facial image within the red signal image in the case that the brightness of illumination is lower than a predetermined threshold value; and
detecting a facial image within the raw image by detecting the facial image within the green signal image in the case that the brightness of illumination is greater than or equal to the predetermined threshold value.

3. A face detecting method, comprising the steps of:
receiving light incident from a human subject for each color component, to obtain a plurality of pieces of pixel data;
generating a raw image of the human subject employing the obtained plurality of pieces of pixel data;
generating a red signal image employing red pixel data, which are among the plurality of pieces of pixel data, obtained by receiving red components of light from the human subject;
generating a brightness approximating signal image employing brightness approximating pixel data, which are pixel data of a color component which has luminosity that approximates brightness, from among the plurality of pieces of pixel data obtained by receiving light from the human subject;
judging whether illumination during photography of the human subject was provided by a tungsten light source;
detecting a facial image within the raw image by detecting the facial image within the red signal image in the case that it is judged that the illumination was provided by a tungsten light source; and
detecting a facial image within the raw image by detecting the facial image within the brightness approximating signal image in the case that it is judged that the illumination was not provided by a tungsten light source.

4. A face detecting method, comprising the steps of:
receiving light incident from a human subject for each color component, to obtain a plurality of pieces of pixel data;
generating a raw image of the human subject employing the obtained plurality of pieces of pixel data;
generating a red signal image employing red pixel data, which are among the plurality of pieces of pixel data, obtained by receiving red components of light from the human subject;
generating a brightness approximating signal image employing brightness approximating pixel data, which are pixel data of a color component which has luminosity that approximates brightness, from among the plurality of pieces of pixel data obtained by receiving light from the human subject;
judging the brightness of illumination during photography of the human subject;
detecting a facial image within the raw image by detecting the facial image within the red signal image in the case that the brightness of illumination is lower than a predetermined threshold value; and detecting a facial image within the raw image by detecting the facial image within the brightness approximating signal image in the case that the brightness of illumination is greater than or equal to the predetermined threshold value.

5. A photography apparatus, comprising:
  imaging means, for receiving light incident from a human subject for each color component, to obtain a plurality of pieces of pixel data;
  image generating means, for generating a raw image of the human subject employing the obtained plurality of pieces of pixel data, for generating a red signal image employing red pixel data, which are among the plurality of pieces of pixel data, obtained by receiving red components of light from the human subject, and for generating a green signal image employing green pixel data, which are among the plurality of pieces of pixel data, obtained by receiving green components of light from the human subject;
  illumination judging means, for judging whether illumination during photography of the human subject was provided by a tungsten light source; and
  face detecting means, for detecting a facial image within the raw image by detecting the facial image within the red signal image in the case that it is judged that the illumination was provided by a tungsten light source, and detecting a facial image within the raw image by detecting the facial image within the green signal image in the case that it is judged that the illumination was not provided by a tungsten light source.

6. A photography apparatus as defined in claim 5, wherein the face detecting means comprises:
  partial image generating means, for generating a plurality of partial images by scanning a subwindow, which is a frame surrounding a set number of pixels; and
  face classifiers, for performing final discrimination regarding whether the plurality of partial images represent faces, employing discrimination results of a plurality of weak classifiers.

7. A photography apparatus as defined in claim 6, wherein:
  the plurality of weak classifiers are arranged in a cascade structure; and
  discrimination is performed by downstream weak classifiers only on partial images which have been discriminated to represent faces by upstream weak classifiers.

8. A photography apparatus as defined in claim 5, wherein:
  the face detecting means further comprises a candidate detecting means, for discriminating whether the partial images represent faces and detecting partial images that possibly represent faces as candidate images; and
  the face classifiers discriminate whether the candidate images detected by the candidate detecting means represent faces.

9. A photography apparatus, comprising:
  imaging means, for receiving light incident from a human subject for each color component, to obtain a plurality of pieces of pixel data;
  image generating means, for generating a raw image of the human subject employing the obtained plurality of pieces of pixel data, for generating a red signal image employing red pixel data, which are among the plurality of pieces of pixel data, obtained by receiving red components of light from the human subject, and for generating a green signal image employing green pixel data, which are among the plurality of pieces of pixel data, obtained by receiving green components of light from the human subject;
  brightness judging means, for judging the brightness of illumination during photography of the human subject; and
  face detecting means, for detecting a facial image within the raw image by detecting the facial image within the red signal image in the case that the brightness of illumination is lower than a predetermined threshold value, and detecting a facial image within the raw image by detecting the facial image within the green signal image in the case that the brightness of illumination is greater than or equal to the predetermined threshold value.

10. A photography apparatus as defined in claim 9, wherein the face detecting means comprises:
  partial image generating means, for generating a plurality of partial images by scanning a subwindow, which is a frame surrounding a set number of pixels; and
  face classifiers, for performing final discrimination regarding whether the plurality of partial images represent faces, employing discrimination results of a plurality of weak classifiers.

11. A photography apparatus as defined in claim 10, wherein:
  the plurality of weak classifiers are arranged in a cascade structure; and
  discrimination is performed by downstream weak classifiers only on partial images which have been discriminated to represent faces by upstream weak classifiers.

12. A photography apparatus as defined in claim 9, wherein:
  the face detecting means further comprises a candidate detecting means, for discriminating whether the partial images represent faces and detecting partial images that possibly represent faces as candidate images; and
  the face classifiers discriminate whether the candidate images detected by the candidate detecting means represent faces.

13. A photography apparatus, comprising:
  imaging means, for receiving light incident from a human subject for each color component, to obtain a plurality of pieces of pixel data;
  image generating means, for generating a raw image of the human subject employing the obtained plurality of pieces of pixel data, for generating a red signal image employing red pixel data, which are among the plurality of pieces of pixel data, obtained by receiving red components of light from the human subject, and for generating a brightness approximating signal image employing brightness approximating pixel data, which are pixel data of a color component which has luminosity that approximates brightness, from among the plurality of pieces of pixel data obtained by receiving light from the human subject;
  illumination judging means, for judging whether illumination during photography of the human subject was provided by a tungsten light source; and
  face detecting means, for detecting a facial image within the raw image by detecting the facial image within the red signal image in the case that it is judged that the illumination was provided by a tungsten light source, and detecting a facial image within the raw image by detecting the facial image within the brightness approximating signal image in the case that it is judged that the illumination was not provided by a tungsten light source.

14. A photography apparatus as defined in claim 13, wherein the face detecting means comprises:

partial image generating means, for generating a plurality of partial images by scanning a subwindow, which is a frame surrounding a set number of pixels; and face classifiers, for performing final discrimination regarding whether the plurality of partial images represent faces, employing discrimination results of a plurality of weak classifiers.

15. A photography apparatus as defined in claim 14, wherein:

the plurality of weak classifiers are arranged in a cascade structure; and discrimination is performed by downstream weak classifiers only on partial images which have been discriminated to represent faces by upstream weak classifiers.

16. A photography apparatus as defined in claim 13, wherein:

the face detecting means further comprises a candidate detecting means, for discriminating whether the partial images represent faces and detecting partial images that possibly represent faces as candidate images; and the face classifiers discriminate whether the candidate images detected by the candidate detecting means represent faces.

17. A photography apparatus, comprising:

imaging means, for receiving light incident from a human subject for each color component, to obtain a plurality of pieces of pixel data;

image generating means, for generating a raw image of the human subject employing the obtained plurality of pieces of pixel data, for generating a red signal image employing red pixel data, which are among the plurality of pieces of pixel data, obtained by receiving red components of light from the human subject, and for generating a brightness approximating signal image employing brightness approximating pixel data, which are pixel data of a color component which has luminosity that approximates brightness, from among the plurality of pieces of pixel data obtained by receiving light from the human subject;

brightness judging means, for judging the brightness of illumination during photography of the human subject; and face detecting means, for detecting a facial image within the raw image by detecting the facial image within the red signal image in the case that the brightness of illumination is lower than a predetermined threshold value, and detecting a facial image within the raw image by detecting the facial image within the brightness approximating signal image in the case that the brightness of illumination is greater than or equal to the predetermined threshold value.

18. A photography apparatus as defined in claim 17, wherein the face detecting means comprises:

partial image generating means, for generating a plurality of partial images by scanning a subwindow, which is a frame surrounding a set number of pixels; and face classifiers, for performing final discrimination regarding whether the plurality of partial images represent faces, employing discrimination results of a plurality of weak classifiers.

19. A photography apparatus as defined in claim 18, wherein:

the plurality of weak classifiers are arranged in a cascade structure; and discrimination is performed by downstream weak classifiers only on partial images which have been discriminated to represent faces by upstream weak classifiers.

20. A photography apparatus as defined in claim 17, wherein:

the face detecting means further comprises a candidate detecting means, for discriminating whether the partial images represent faces and detecting partial images that possibly represent faces as candidate images; and the face classifiers discriminate whether the candidate images detected by the candidate detecting means represent faces.

* * * * *